June 13, 1950 B. F. WHEELER 2,511,137

FREQUENCY CONTROL

Filed Dec. 16, 1944 4 Sheets-Sheet 1

INVENTOR.
Benjamin F. Wheeler
BY
H. S. Grover
ATTORNEY

June 13, 1950 B. F. WHEELER 2,511,137

FREQUENCY CONTROL

Filed Dec. 16, 1944 4 Sheets-Sheet 2

INVENTOR.
Benjamin F. Wheeler
BY H. S. Grover
ATTORNEY

June 13, 1950

B. F. WHEELER

FREQUENCY CONTROL 2,511,137

Filed Dec. 16, 1944

4 Sheets-Sheet 3

INVENTOR.
Benjamin F. Wheeler
BY H. S. Grover
ATTORNEY

June 13, 1950

B. F. WHEELER 2,511,137

FREQUENCY CONTROL

Filed Dec. 16, 1944

4 Sheets-Sheet 4

INVENTOR.
Benjamin F. Wheeler
BY
H. S. Grover
ATTORNEY

Patented June 13, 1950

2,511,137

UNITED STATES PATENT OFFICE 2,511,137

FREQUENCY CONTROL

Benjamin Frederick Wheeler, Haddonfield, N. J., assignor to Radio Corporation of America, a corporation of Delaware Application December 16, 1944, Serial No. 568,433

2 Claims. (Cl. 250—36)

Figure 1:
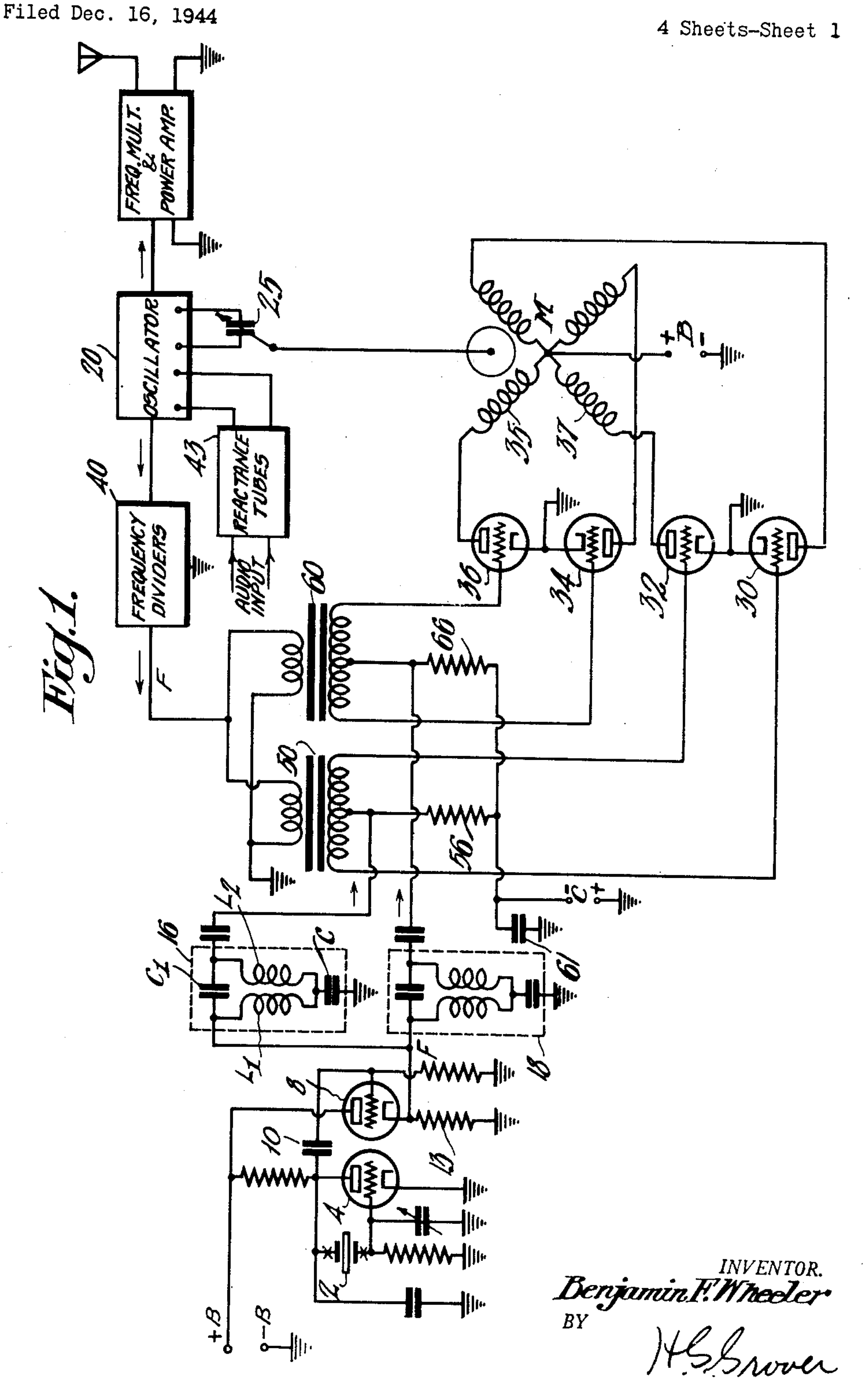

This application discloses an improved frequency control system for use with oscillation generators the frequency of which may drift in an undesired manner. It is particularly applicable to controlling frequency (or angular velocity) modulated transmitter oscillators the mean frequency of which is to be stabilized.

The main object of my invention is to simplify control of the mean frequency of angular velocity modulated oscillation generators.

A further object of my invention is to simplify control of the mean frequency of angular velocity modulated oscillation generators, and yet permit the mean frequency of the oscillation generator to be adjusted to various points in a wide band of frequencies.

A more detailed object of my invention is to provide an automatic control system for an angular velocity modulated generator that requires no tuning elements to adapt the same for use in different channels covering a wide band of transmitter frequencies.

Briefly, these objects are attained by the use of a constant frequency reference source of a frequency equal to the controlled generator frequency, or a multiple or sub-multiple thereof, an untuned buffer stage, and a frequency comparison device. By the use of frequency multipliers or frequency dividers, if needed, currents of the same mean frequency are derived from the two sources. These currents, one of which may drift in frequency, are supplied by couplings to the phase comparison stage. A feature of my invention resides in the use of a wide band phase shifter or wide band phase shifters in the coupling or couplings of the two sources to the frequency comparison stage to establish a phase displacement of the currents from the two sources which will permit detection of relative changes in the phase or frequency of the two currents, and thus provide a suitable control action for correcting the frequency of the controlled generator.

If the frequency of the controlled generator is to be changed, i. e., shifted to a different channel, all that need be altered in my improved frequency control system is the frequency of the constant frequency source. This is because of the wide band characteristics of the phase shifters and of the use of phase detector circuits which are aperiodic or untuned.

In the preferred embodiment a quartz crystal generator is used as the reference frequency source and when the transmitter is retuned to a different frequency the only change required in the automatic frequency control circuit is replacement of the crystal in the oscillator with a new one of the proper frequency.

In practice the oscillations to be compared with the reference oscillations may be taken from the modulated oscillator or from a frequency divider or a frequency multiplier coupled thereto. In the embodiments described, the reference source is shown as a crystal oscillator and oscillations of the normal frequency of operation are supplied to the phase comparison circuit. It will be understood that frequency multipliers or dividers may be interposed between the crystal and the phase comparison circuit so that the crystal may operate at a low frequency or at a relatively high frequency. It should also be understood that the two frequency sources may be interchanged in their connections to the comparison circuit without affecting the principles of operation.

In describing my invention in detail reference will be made to the attached drawings wherein Figs. 1 and 2 each illustrate an embodiment of my improved automatic frequency control circuit.

Figure 1A:
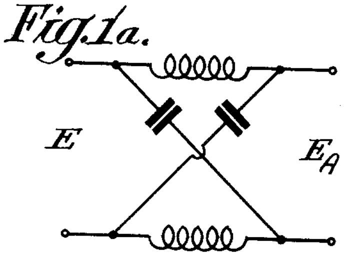
Figure 1B:
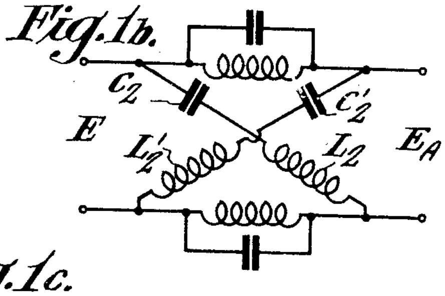
Figure 1C:
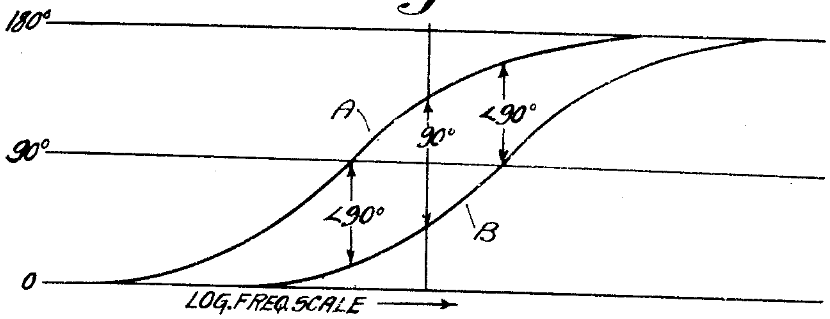
Figure 2:
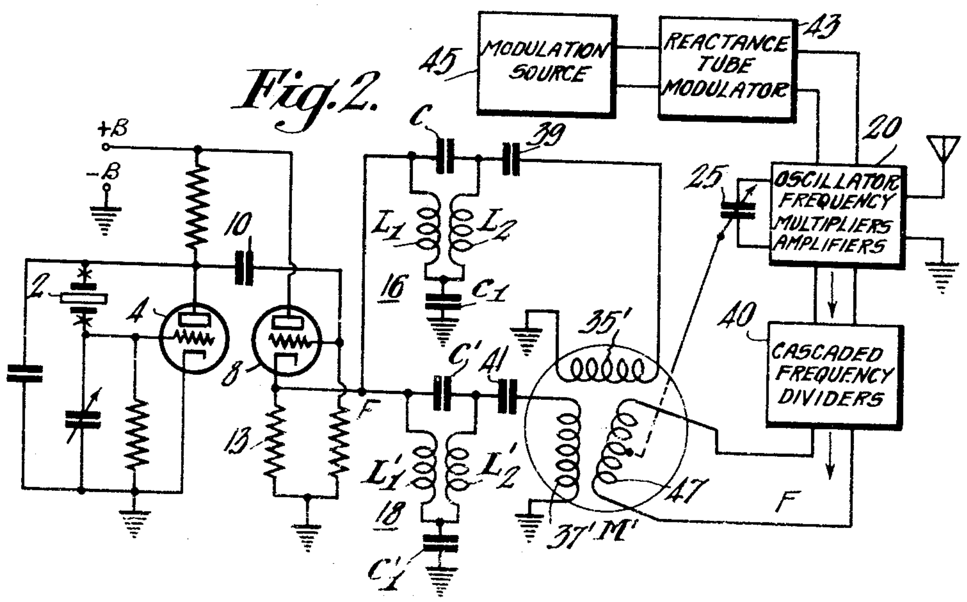

Figs. 1*a*, 1*b*, 1*c*, and 3 illustrate the wide band phase shifting networks used in the automatic frequency control circuits of Figs. 1 and 2, and the characteristics of the said networks. These figures are used in describing my invention.

Figures 4, 5, 6:
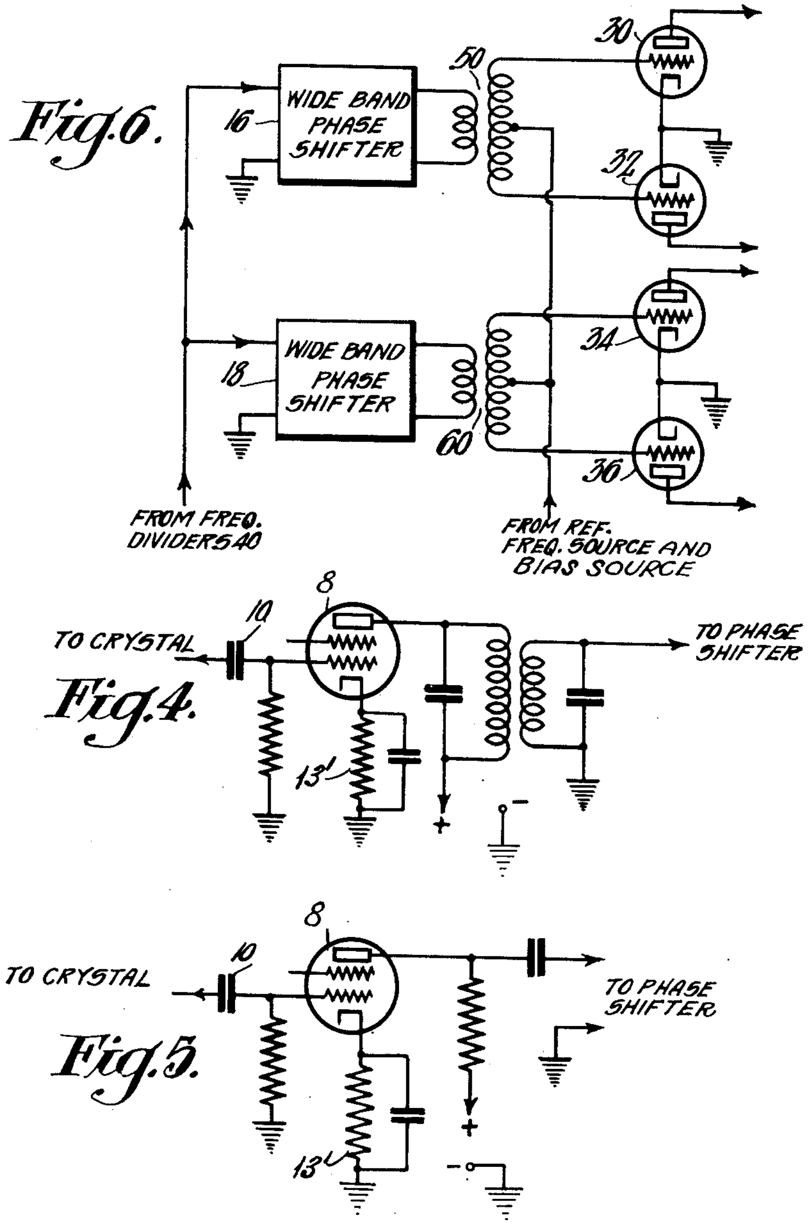

Figs. 4, 5, and 6 are modifications of the arrangements of Figs. 1 and 2.

As illustrated in Figs. 1 and 2, my invention is used in a frequency modulation system but is not limited to such use. The constant frequency reference source is a crystal oscillator including a crystal element 2 coupling the anode of vacuum tube 4 to the grid thereof in a conventional crystal oscillator using the principle involved in Pierce U. S. Patent #2,133,642, dated October 18, 1938. This portion of the system involves no tuned elements except the tuning inherent in the quartz crystal, which may be replaced by a crystal of different frequency as indicated by the crosses at the crystal holder terminals.

Following the crystal oscillator is a buffer amplifier tube 8 with its grid coupled to the anode of tube 4 by a condenser 10. The amplifier and buffer stage 8 is conventional, being of the cathode follower type. The output is taken from the cathode resistance 13. This stage is used for isolation purposes and to obtain a low impedance output source which is desirable for driving the following circuits. The input impedance of the cathode follower amplifier is considerably larger than that of other forms of amplifiers, thereby reducing the reaction upon the crystal oscillator circuit.

Output of the cathode follower stage in Fig. 1 is fed through phase shifting networks 16 and 18 to a phase detecting device. The purpose of the phase detecting device is to obtain as output oscillations having a frequency equal to the difference between the frequency of oscillations from the reference source, i. e., the crystal oscillator and oscillations of about the same frequency derived from the frequency modulated oscillator at 20. These ouput oscillations may then be used in any appropriate manner, many of which are well known, to retune the unstable source.

In the embodiments described, tuning of the oscillator to be stabilized is to be accomplished by motor M in Fig. 1 and motor M' in Fig. 2. Moreover, in both embodiments the motors include windings angularly related which are preferably excited in phase quadrature to produce rotating fields. In Fig. 1, two beat notes each of which is equal to the difference frequency of the two sources and the relative phases of which reverse as the variable source frequency passes through the reference source frequency are used. My phase detecting device of Fig. 1 is therefore arranged to provide the two beat notes which produce the rotating field of the motor M which operates the tuning mechanism 25 of the frequency modulated oscillator. To obtain this rotating field, a 90° phase shift between beat frequencies is required. This phase displacement is obtained regardless of the beat frequency by feeding the phase detecting device from the reference frequency source through wide band networks, the outputs of which differ in phase by 90°.

Alternatively, the phasing networks may be inserted in the controlled frequency branch, say between the frequency divider 40 and transformers 50 and 60. The arrangement is then as illustrated in Fig. 6.

The wide band phase shifting networks 16 and 18 each comprise coupled shunt inductances L1 and L2 and condenser C with series condenser C1. The elements as shown in Figs. 1 and 2 are derived from a lattice network of the all-pass type. A simplified version of this network is shown in Fig. 1*a*, where through the frequency range from zero to infiinite frequency there is a phase shift of 180° between the input voltage E and output voltage EA. The phase characteristic of this network is represented in Fig. 1*c* by curve A. By using other element values the phase characteristic may be as illustrated by curve B of Fig. 1*c*. By using two of these networks having different element values it is possible to obtain an approximately 90° phase difference over a range of frequencies, as indicated by phase characteristics A and B of Fig. 1*c*.

This principle has been described in Curtis U. S. Patent #2,151,464.

Figure 3:
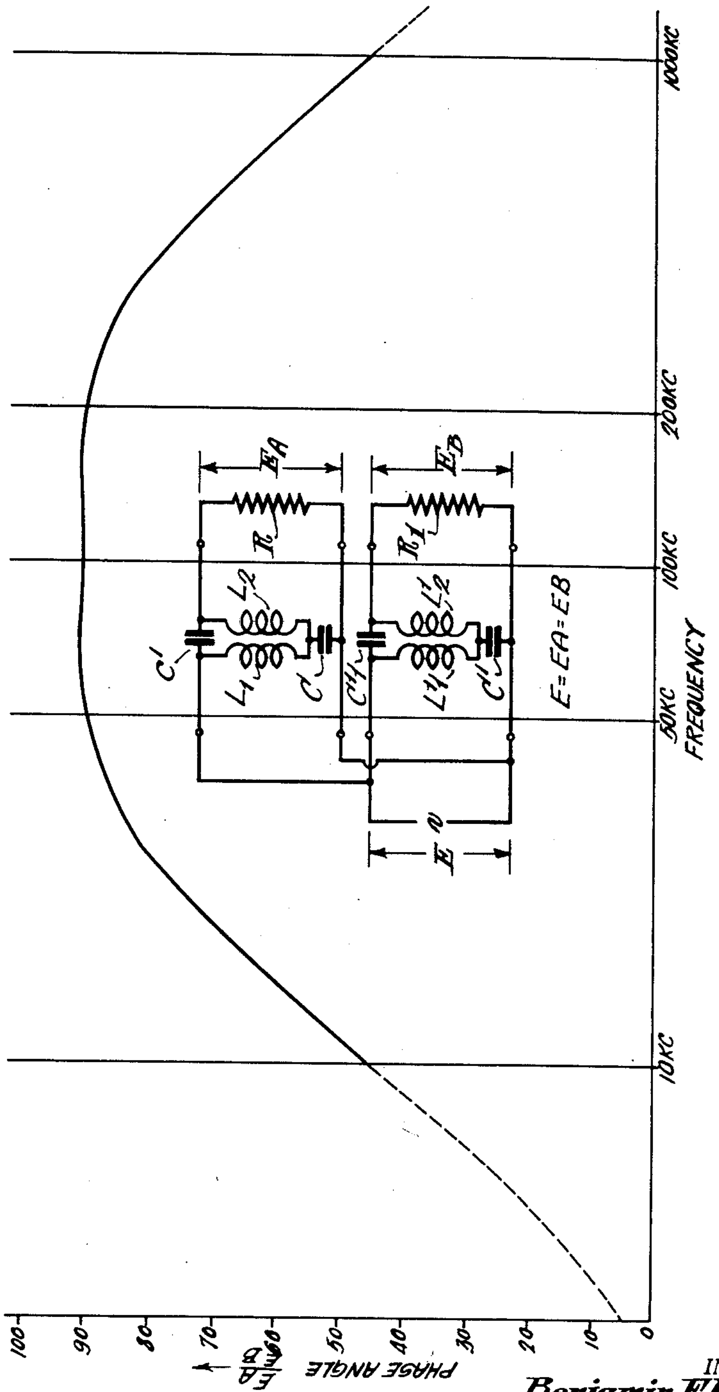

Improvement in the performance over a wide pass band may be obtained by using a modified version of the lattice network as shown in Fig. 1*b*. By the choice of suitable circuit constants, it is possible to extend the range of the 90° phase difference between the two networks over a very wide range of frequencies, such as, for example, shown in Fig. 3. The individual networks are then such as to include within the desired frequency range the linear portion of the network phase characteristic. In Fig. 3, oscillations from the crystal source supply voltages E to the network inputs and voltages EB and EA which are displaced each from the other by 90° for a very wide band of frequencies are obtained. To reduce the number of elements, and to permit an unbalanced circuit, it is possible to derive from the network of Fig. 1*b* a bridged T network such as is shown in Figs. 1, 2, and 3. The electrical characteristics of the derived form are identical to those of the lattice arrangement.

The improved performance obtained from a network as shown in Fig. 1*b* is gained because of the more linear phase characteristic through the central portion of the curve where it crosses the 90° axis. The series resonant elements C2L2 and C'2L'2 in the lattice network of Fig. 1*b* are resonant at frequencies above and below the design center of the network. The ratio of the operating frequency to the resonant frequencies, and the ratio of element impedances to the characteristic impedance determines the shape and linearity of the resulting phase characteristics.

As an example of the circuit elements and frequencies involved reference is made again to Fig. 3. In this embodiment the 90° portion of the network phase characteristic covers a 4 to 1 frequency range with the geometric mean at 100 kc.

C= .049 μf.
C1= .0046 μf.
L1=5.35 mh.
L2=5.35 mh. } M=−4.49 mh.
C'= .014 μf.
C'1= .0013 μf.
L'1=1.51 mh.
L'2=1.51 mh. } M=−1.25 mh.
R and R1=1000 ohms By operating several similar networks in cascade it is possible to extend the frequency range to greater than a 4 to 1 ratio.

The frequency comparison device shown in Fig. 1 takes the form of a pair of phase detectors or balanced modulators similar to that described by Marrison U. S. Patent 1,762,725. The grid voltage on each of the four tubes 30, 32, 34, and 36, is obtained both from the reference frequency source and the variable frequency source.

Voltage of the proper frequency is supplied from the modulated oscillator 20 by way of the necessary number of dividers 40 to the primary windings of two transformers 50 and 60. The secondaries of these windings are coupled differentially or in pushpull relation between the grid electrodes of the tubes of the two balanced modulators. Oscillations of like phase are thus applied in pushpull relation to the control grids of the tubes of each balanced modulator.

The phase shifter 16 has its output supplied in parallel to the control grids of tubes 30 and 32 of one balanced modulator by coupling to a mid-point on the secondary winding of transformer 50. The phase shifter 18 has its output supplied in parallel to the control grids of the tubes 34 and 36 of the other balanced modulator by a coupling to a mid-point on the secondary winding of transformer 60. Bias for these tubes is supplied through resistances 56 and 66 connected to ground through a source C shunted by a bypassing condenser 61. Resistances 56 and 66 also serve to properly terminate the filter networks in their characteristic impedance.

The balanced modulator tubes 30, 32, 34 and 36 are biased approximately to plate current cutoff in the absence of signals from either the reference or modulated oscillator sources. The plate circuits of the balanced modulators include the windings 35 and 37 of a two-phase motor M which may be either synchronous or non-synchronous in character. The windings of this motor are displaced from one another by 90 electrical degrees and are so balanced that the direct current plate current components in the two halves of each winding are in opposition. Plate supply voltage is obtained from a common source B applied to a center tap of the two phase windings of the motor. The rotor shaft of the motor is mechanically connected to the capacitor 25 or other device controlling the frequency of the modulated oscillator 20.

In the embodiment illustrated in Fig. 1, assume first that there is no modulation of oscillator 20, and that the frequency of the energy from the reference source and of the output of the dividers excited by the oscillator 20 are exactly the same. In this condition there is no alternating current output from the balanced modulators, thus no rotating field in the motor and it remains stationary. If the frequency of the oscillator 20 drifts in one direction or the other the balanced modulators produce a difference frequency output. The direction of field rotation in the motor will then depend on the direction of frequency drift of the oscillator 20 with respect to the reference source, and the condenser 25 is rotated to return the oscillator 20 to synchronize the oscillations supplied to the balanced modulators.

When frequency modulation of oscillator 20 is present, there is a similar frequency modulation present at the input to the balanced modulators, and of the same rate (determined by the audio frequency), but of lower deviation (due to the dividers). Considering the input to the balanced modulators, it is well known (see Roder, "Phase, Amplitude and Frequency Modulation," I. R. E. Proc., Dec. 1931) that carrier and side frequencies are present. At certain combinations of deviation and audio frequency the carrier amplitude may become zero. Since it is this carrier frequency that we are attempting to stabilize this condition cannot be allowed. The first point at which this occurs for sine wave modulation is where the deviation ratio, $$\frac{\text{Deviation}}{\text{Audio freq.}}=2.405$$

We must therefore make sure that the frequency deviation due to modulation at the input to the balanced modulators is less than 2.405 times the lowest audio modulating frequency it is proposed to use. The presence of the side frequencies does not affect normal operation provided the carrier amplitude is greater than that of the side frequencies. This condition is obtained when the deviation ratio is less than 1.435.

The balanced modulator phase detector and motor arrangement is known in the prior art and it is believed that the brief description thereof given hereinbefore is sufficient.

The frequency comparison device need not necessarily be of the form illustrated in Fig. 1. It may take many other forms. For example, I may use an arrangement as illustrated in Fig. 2, wherein phase detection is accomplished in the motor M'. In this embodiment the rotating field is produced directly by the source frequencies. In effect the motor M' acts as a combination phase detector and tuning element drive.

In Fig. 2 the constant frequency source including tube 4, cathode follower, buffer amplifier including tube 8, and wide band phase shifting networks 16 and 18 are as described hereinbefore. Network 16 feeds a winding 35' while network 18 feeds a winding 37'. The connections to the winding 35' and 37' include coupling condensers 39 and 41 which prevent direct current from flowing in the motor windings. A rotor winding 47 is connected to the output of the controlled source through the divider stages 40, if necessary, and the motor winding 47 is associated with a driven shaft or other means connected with the rotor of the tuning element 25.

Motor M' is similar in principle to the familiar "synchroscope" used for synchronization of two power system frequencies. A rotating magnetic field is created by the two phase displaced currents fed to stator windings 35' and 37'. The rotor winding, 47, excited from a single phase source 40, exhibits an alternating field. As a consequence, rotor 47 will rotate to align its field at the time of peak current through 47 with the instantaneous position of the rotating field due to 35' and 37'.

Consequently, if sources 4 and 40 are in synchronism, no rotating torque will be developed, and if they are not in synchronism, a rotation corresponding in direction to the relative frequencies will be developed.

Obviously, this device cannot be operated at as high frequencies as the balanced modulator arrangement previously described, but it shows the wide application of the method devised.

The buffer amplifier need not necessarily be of the cathode follower type. I may use a buffer stage tube 8 in a band pass circuit as illustrated in Fig. 4, or resistance coupled as in Fig. 5, or any other arrangement not requiring tuning. The cathode follower arrangement is preferable except where additional gain is required.

As to the transmitter systems each thereof may include as described above in 20 a source of oscillations frequency modulated as desired, for example, by means of a reactance tube modulator in unit 43 controlled by signals from any source. 20 may also include the desired number of frequency multipliers, amplifiers, etc., to provide frequency modulated oscillations of the desired final frequency and amplitude. The crystal oscillator including unit 4 may operate at a frequency F equal to the frequency F at the output of the dividers 40, or at some higher or some lower frequency. If the frequency of the crystal oscillator is above the frequency F, frequency dividers may be included between the crystal oscillator tube 4 and the phase shifters 16 and 18. If the frequency of the crystal oscillator including tube 4 is below the frequency F frequency multipliers may be included between the crystal oscillator and the phase shifters 16 and 18.

What is claimed is:

1. In a frequency control system in combination, a first source of oscillations the mean frequency of operation of which may drift, a source of oscillations of substantially fixed frequency integrally related to the desired mean frequency of said first source, a phase comparison device arranged to detect relative changes in phase between two phase displaced currents, said phase comparison device comprising a motor having two field producing stator windings, and a rotor winding, a coupling between said source the mean frequency of which may drift and said rotor winding, a coupling between each of said two stator windings and said source of substantially fixed frequency, a wide band phase shifter in each of said couplings between said substantially fixed frequency source and said stator windings for establishing a phase displaced relation between said currents fed to the respective stator windings, and tuning means for said first source operated by said rotor winding.

2. In a frequency control system, a first tunable source of oscillations the frequency of which is to be modulated by signals, and the mean frequency of operation of which may drift, a source of oscillations of substantially fixed frequency integrally related to the desired mean frequency of said first source, a phase comparison device including a rotor winding and field windings angularly arranged, an untuned buffer amplifier coupled to said last named source, a coupling between said buffer amplifier and each of said angularly arranged windings, a wide band phase shifter in said couplings between the buffer amplifier and the angularly arranged windings to introduce a phase displaced relation between the currents fed to the respective field windings from said last-named source to produce a rotating field, said phase displaced relation being substantially constant for a wide band of frequencies, said rotor winding being actuated by said rotating field, a tuning element associated with said first source and coupled to said rotor winding to be operated thereby to control the frequency of said first source, and a coupling between said first source and said rotor winding.

BENJAMIN FREDERICK WHEELER.

REFERENCES CITED

The following references are of record in the file of this patent:

UNITED STATES PATENTS

| Number | Name | Date |
|---|---|---|
| 1,731,264 | Potter | Oct. 15, 1929 |
| 1,762,725 | Marrison | June 10, 1930 |
| 1,896,238 | Hund | Feb. 7, 1933 |
| 1,934,400 | Bollman | Nov. 7, 1933 |
| 1,942,602 | Hyland | Jan. 9, 1934 |
| 2,104,801 | Hansell | Jan. 11, 1938 |
| 2,183,399 | Heising | Dec. 12, 1939 |
| 2,232,390 | Katzin | Feb. 18, 1941 |
| 2,250,104 | Morrison | July 22, 1941 |
| 2,358,454 | Goldstine | Sept. 19, 1944 |
| 2,392,476 | Hodgson | Jan. 8, 1946 |